United States Patent [19]

Bosley et al.

[11] Patent Number: 4,690,371
[45] Date of Patent: Sep. 1, 1987

[54] ELECTROMAGNETIC VALVE WITH PERMANENT MAGNET ARMATURE

[75] Inventors: Robert W. Bosley, Cerritos; Samson Kirshman, San Jose; Dan B. LeMay, Palos Verdes Estates; Wayne G. Renken, San Jose, all of Calif.

[73] Assignee: Innovus, San Jose, Calif.

[21] Appl. No.: 790,279

[22] Filed: Oct. 22, 1985

[51] Int. Cl.[4] ............................................. F16K 31/08
[52] U.S. Cl. .................... 251/65; 251/129.01; 251/129.08; 251/129.1; 251/129.21
[58] Field of Search ................. 251/65, 129.08, 129.1, 251/129.21, 129.01

[56] References Cited

U.S. PATENT DOCUMENTS

| | | | |
|---|---|---|---|
| 2,579,723 | 12/1951 | Best | 251/129.1 X |
| 2,886,063 | 5/1959 | Ray | 251/129.21 X |
| 3,833,015 | 9/1974 | Knever | 251/129.21 X |
| 3,850,196 | 11/1974 | Fales | 251/129.08 X |
| 4,071,042 | 1/1978 | Lombard et al. | 251/65 X |
| 4,386,626 | 6/1983 | Hehl | 251/129.08 X |

FOREIGN PATENT DOCUMENTS

| | | | |
|---|---|---|---|
| 106275 | 6/1963 | Japan | 251/129.08 |
| 134089 | 8/1982 | Japan | 251/129.1 |
| 715876 | 2/1980 | U.S.S.R. | 251/129.21 |

Primary Examiner—Arnold Rosenthal
Attorney, Agent, or Firm—Thomas S. MacDonald; Alan H. MacPherson; Paul J. Winters

[57] ABSTRACT

A modulating valve is described for controlling the flow of a working fluid through a flow orifice. The valve includes a encapsulated armature having a permanent magnet and a pair of soft iron pole pieces within its interior. The armature is axially movable by the passage of current through one or a dual pair of solenoid coils surrounding the armature. A thin webbed sealing disk is stretched over the end of an armature housing extension and acts to close or modulate flow of working fluid by varying the axial clearance between the disk and a stationary annular seat of the flow orifice. The armature is supported on flexure guide springs that allow armature axial motion when axial magnetic forces are applied to the armature. These axial forces are provided by the interaction of the solenoid coil(s) and the field of the permanent magnet. A magnetic field gradient produced by the permanent magnet allows the coil to apply a force to the armature in either the valve opening or valve closing direction, depending on the coil current polarity. An armature velocity signal is used in a closed loop servo control of valve position to suppress valve oscillation and over shoot when a change in valve position is commanded.

13 Claims, 14 Drawing Figures

ELECTROMAGNETIC VALVE WITH PERMANENT MAGNET ARMATURE

CROSS REFERENCE TO RELATED APPLICATION

This application is an improvement over the invention disclosed in U.S. Application Ser. No. 06/721,535 filed 04/10/85 entitled Thermal Mass Flowmeter and Controller, by Messrs. Renken, LeMay and Takahashi, which application is assigned to the same assignee as the present application, the disclosure of which is incorporated herein by reference.

BACKGROUND OF THE INVENTION

1. Field of the Invention

This invention relates to the field of modulating (proportioning) electromagnetic control valves used to control gas or fluid flow rates in high-performance applications.

2. Material Information

Known electromagnetic modulating valves use a soft iron armature for the moving part of the valve. A magnetic field produced by an electromagnet (solenoid) coil provides a tractive force between the armature and an iron pole piece, usually in a direction that tends to open the valve. This force is always in the same direction when current of either polarity is passed through the coil. This force is nominally proportional to the square of coil current (until iron saturation phenomena occur). One or more springs produce forces that oppose the solenoid force. The net force applied to the armature is thus the difference between the solenoid and spring forces. The armature movement is proportional to the net force applied to it and inversely proportional to the spring rates of the mechanical springs between the armature and housing. For smooth operation the mechanical design requires low friction which consequently results in low damping. During fast dynamic transient operation the valve can overshoot and then oscillate at its natural spring-mass frequency without convenient means for achieving stability.

For example, in the related application (FIG. 9) an armature 84 having flow passages 84a therein is movable against end springs 84b, 85a to seat and unseat a valve seal on an orifice 97. An armature coil 95 surrounds armature 84 and flow of current dictated by a sensed flow in a flow channel moves the armature to regulate gas flow through the orifice. Upon cessation of current flow the valve seal returns to a fail-safe closed position against the orifice.

Many solenoid valves have been designed with permanent magnets in the armature for the purpose of achieving bistable or "latching" operation. These are not modulating valves because they do not operate over a continuously variable range of stable positions, and hence are not pertinent to the present invention.

Known modulating valves use a compliant elastomeric sealing disk attached to the armature by chemical bonding or mechanical retention. Chemically resistant elastomers are difficult to bond to the armature and, if bonded, suffer from reduced resistance to chemical attack in the bond area. Mechanical retention methods include insertion of a relatively thick and oversized sealing disk into a cavity with reentrant side walls or alternatively the sealing disk may be mechanically clamped around its perimeter.

SUMMARY OF THE INVENTION

Gas flow is controlled in the electromagnetic control valve of this invention by varying the axial clearance between a compliant sealing disk (attached to a movable armature) and a stationary annular seat. The armature and sealing disk are supported on flexure guide springs that allow axial motion of the armature if axial forces are applied to that armature. These axial forces are provided by the interaction between the field of a permanent magnet situated in the armature and the control field of a stationary electromagnet (solenoid) coil and magnetic coil housing. The magnetic field gradient produced by the permanent magnet allows the solenoid coil to apply force to the armature in either the valve opening or closing direction, depending upon the coil current polarity. Motion of the armature provides a back emf (electromotive force opposing the current) which produces an additional voltage and/or current in the solenoid coil. This voltage/current constitutes an armature velocity signal that is used in a closed loop servo control of valve position to suppress valve oscillation and overshoot when a change in valve position is commanded. Attributes improved by the invention are reduced overshoot with improved speed of response and dynamic controllability.

The permanent magnet's position within the iron return path controls the axial force applied to the armature with power off, thereby providing normally-open or normally-closed designs without the need for substantial mechanical spring forces. The effective axial spring rate of the armature can be set at an arbitrarily low value by setting the positive spring rates of mechanical springs to cancel any desired fraction (or all) of the negative spring rate established by the armature magnet interacting with the coil's iron return paths. This gives design latitude in setting the natural frequency of the armature and the valve sensitivity in terms of stroke per amp-turn.

By the present invention the characteristics of electromagnetic modulating valves are improved by permitting bidirectional manipulation of the electromagnetic forces, and by providing a velocity-dependent signal useful for feedback control of the valve drive voltage.

A unique elastomeric seal is provided as part of the invention which provides a soft thin sealing surface with reduced dimensional sensitivity to material swelling. This maintains consistent valve performance and control range even when exposed to reactive chemicals or high temperatures.

Even chemically resistant elastomers swell considerably when exposed to many fluids, vapors, or gases and also have high coefficients of thermal expansion. Variation in elastomer thickness over time, due to temperature changes or chemical exposure, will cause variations in valve closing force preloads due to displacement of the armature and compression of the mechanical spring system. This alters the voltage/current which must be supplied to the coil to reach the required opening force and may limit armature stroke and the full flow capacity of the valve. Swelling or dimensional changes, are proportional to thickness, but thick sealing disks are easier to mechanically retain.

A purpose of this invention is thus to improve upon the form and mechanical retention method of the compliant sealing disk to permit the use of thin sealing materials directly above the annular seat area.

DETAILED DESCRIPTION

Figure 1:
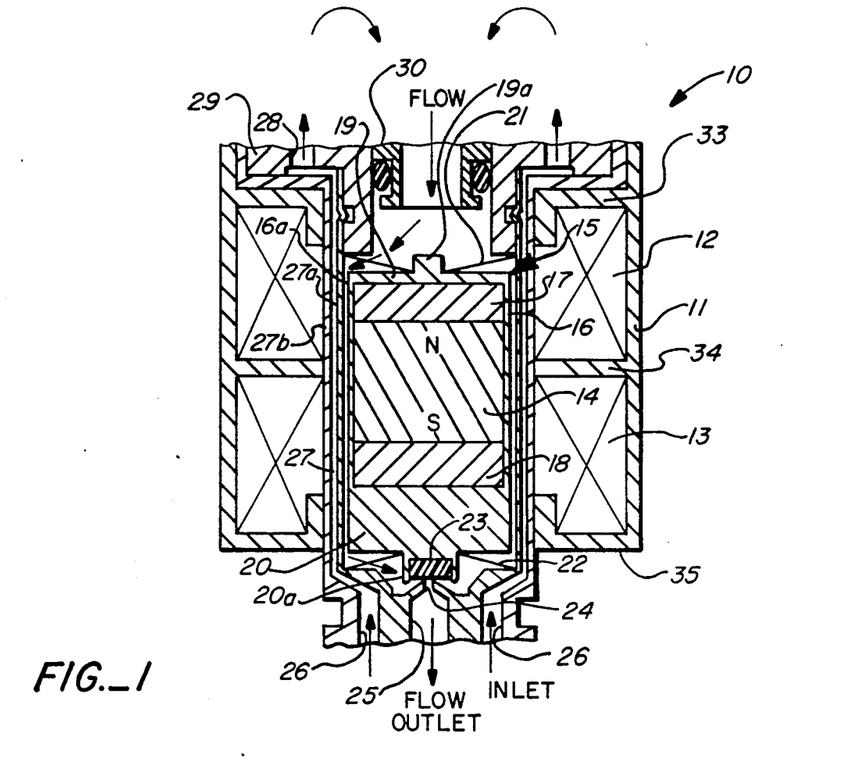
FIG. 1 is a cross-sectional partial side view of the combined permanent magnet armature and electromagnetic valve of the invention.

In FIG. 1 valve 10 includes a cylindrical ferromagnetic coil housing 11 which encompasses a pair of cylindrical annular solenoid coil sections 12, 13, and a centrally disposed permanent magnet armature assembly 15. Armature assembly 15 includes a cylindrical housing 16 and a permanent magnet 14 fixedly mounted therein. Magnet 14 is preferably a neodymium-boron or samarium-cobalt magnet of 25,000-35,000 gauss force at its periphery and housing its N pole oriented facing away from the flow control orifice and its S pole facing toward the flow control orifice.

Orientation of the coil housing 11 relative to the midpoint of magnet 14 determines whether the armature and valve seal will be positioned in a normally (power off) valve open or valve closed position. Coil housing 11 is shown in FIG. 1 displaced above the magnet midpoint toward its north pole resulting in an unbalanced magnetic force holding the armature in a downward normally closed position. Magnet pole orientation determines the direction of the current flow through the solenoid coils. The magnet pole orientation should be consistent with the N-S poles of the electromagnetic solenoid coils.

Cylindrical housing or encapsulation 16 may be of 316 SS (stainless steel) or of Teflon or KEL-F fluoroplastic material. Soft iron pole pieces 17 and 18 abut the poles of magnet 14. Housing 16 includes a cap 19 with an axial plug extension 19a. A centrally apertured circular spider spring 21, such as shown in FIG. 10 of the related application, is affixed to plug 19a. The housing or encapsulation 16 is thick axially at its bottom 20 and contains an axial extension 20a holding a second spring 22 and mounting valve seal 23. Valve seal 23 is positioned in the extension of the housing bottom 20 and is oriented to seal and unseat on a flow control orifice 24 leading to a working fluid outlet passageway 25. Housing 16, including magnetically inert end cap 19 and attached valve seal 23, with the interior magnet 14 and interior pole pieces 17, 18 fixedly mounted therein, are laser or thermally welded together to form the overall movable armature assembly 15. A thin insulator (not shown) may be utilized between the inner periphery of coils 12, 13 and the outer surface wall of housing 27b.

Inlet flow of gas or other working fluid to the valve is typically through an inlet 26 and an annular passageway 27 between a 316 SS inner cylindrical wall 27a and a 316 SS thin outer cylindrical wall 27b annularly disposed about the armature housing 16, then through apertures 28 in an upper cylindrical valve support plate 29. The outer peripheral edge of spring 21 abuts the lower flange edge of plate 29. Gas flow continues from apertures 28 to a flow sensing section (not shown) which as seen in the related application (particularly FIGS. 3, 7 and 9) comprises sensor channels having mass flow sensors contained therein. Gas flow exits the sensing section through central nozzle 30 and is directed down the annulus 16a between wall 27a and the armature housing 16 to orifice 24. which, when open, allows gas flow to gas outlet 25.

Pole pieces 33 and 35 and a ferromagnetic disk 34 are provided at the top and bottom of the coils and between the coils, respectively, in a two-coil embodiment of the invention, to optimize the magnetic flux developed by the action of the permanent magnet and solenoid coils. The two axially disposed coil sections 12 and 13 and disk 34 provide separate magnetic field paths through the opposite soft iron pole pieces 17, 18 within the armature housing, the two coils being connected in series such that a current passed through both coils will cause both fields to force the armature in the same direction.

All of the magnetic materials are remote from the gaps forming the flow passageways. In previous designs, such as in the related application, minimum gaps forming the gas passageways were necessary to give maximum magnetic efficiency.

The magnetic force generated in the magnetic circuit shown in FIG. 1 is similar to a negative spring rate. In combination with a mechanical spring the net rate can be made positive, but arbitrarily small. A low net spring rate results in a low mechanical natural frequency, which in turn prevents the occurrence of valve oscillations beyond the control capabilities of a feedback control system such as a flow control. A low net spring rate also provides greater stroke per unit change of coil power, and therefore greater efficiency while modulating in an open condition.

When the armature assembly 15 moves, its permanent magnetic field from permanent magnet 14 varies the flux intersecting the turns in the solenoid coil(s), thereby producing an opposing voltage or back emf in the coil. If the coil is driven by a voltage source (as opposed to a current source) then the back emf caused by armature motion will reduce the net coil voltage and current. The back emf thereby provides dynamic damping. The overall solenoid coil 12, 13 is wound in two sections and connected such that a current passing through the two sections in series will produce fields in opposite directions, thereby both attracting the armature and permanent magnet to one end of the assembly and repelling it away from the other end. The permanent magnet moving armature assembly 15 is combined with the fixed soft iron magnetic return path, formed by pole pieces 33, 34, 35 and pole pieces 17 and 18, which are positioned with respect to the armature assembly such that the valve is normally forced in one direction to a "valve closed" position by the permanent magnet in the absence of coil current.

The armature housing 16 shown in FIG. 1 may be made corrosion resistant from the gases being passed thereby by constructing it from a corrosion resistant impermeable nonmagnetic material such as 316 SS or Teflon or KEL-F fluoroplastic. It is to be noted that the coils and the ferromagnetic path(s) are located radially external of the valve annular inner housing wall 27a so that no magnetic or corrosion sensitive materials, other than the permanent magnet 14 and soft iron pole pieces 17 and 18 within encapsulation housing 16, are exposed to the gases or other working fluid being through-putted and controlled in the valve.

The mechanical springs 21, 22 or other stops are provided to axially center the movable armature assembly 15 and produce an axial force such that the net spring and magnetic force, acting on the armature in the absence of coil current, is always in a closing or opening direction for normally closed and normally open valve configurations, respectively.

Figure 2A:
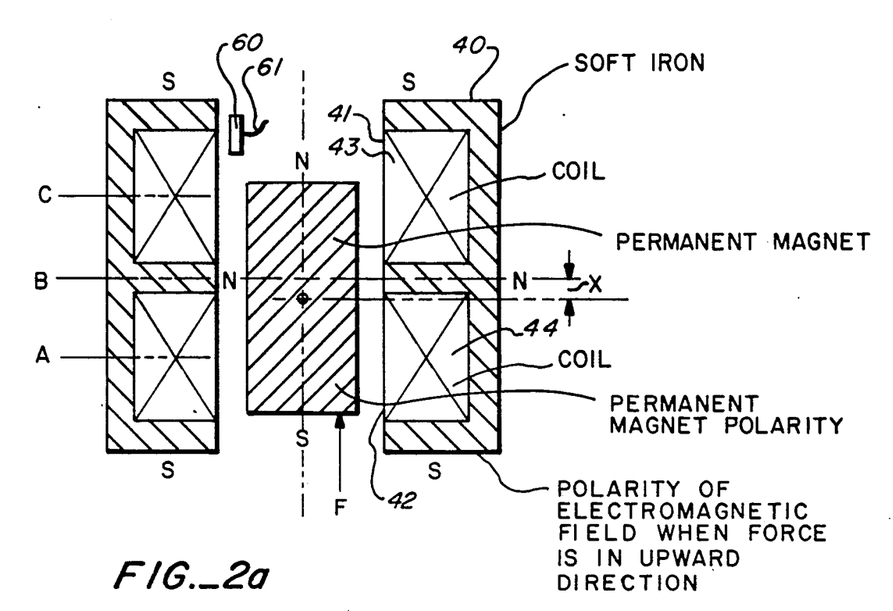
FIG. 2a is a schematic view of the magnetic elements and magnetic circuit of a dual coil embodiment of the invention.

FIG. 2a shows the magnetic elements of the valve in schematic plan view and the preferred polarity of each where N=magnetic north and S=magnetic south. The polarity of the electromagnetic field is shown so that the overall magnetic force F is in the axial direction. A soft iron ferromagnetic E-shaped pole piece 40 surrounds all but the interior facing surfaces 41, 42 of coils 43, 44.

Letters A, B, and C indicate the three positions where the axial force on the armature is zero. The armature is magnetically attracted to positions A and C because of the proximity of the iron path through the magnet center and one end of the armature housing. Position B has zero axial force by symmetry, but, with a small displacement, e.g. X, off center, the armature is attracted further off center to position A or C.

One of the magnetic return paths may be utilized by positioning therein a magnetic field sensor 60 of the Hall-type if coil 43 is deleted or remains unpowered, to provide a position and/or velocity signal on lead 61 resultant from the magnetic field of the permanent magnet armature. A control circuit can utilize the signal on lead 61 to provide feedback to reduce overshoot, enhance the speed of response and stability of the valve to dynamic changes. Alternatively, coil 43, if unpowered, may provide velocity sensing directly from such field which can be used by such feedback control loop to provide valve stabilization.

Figure 2B:
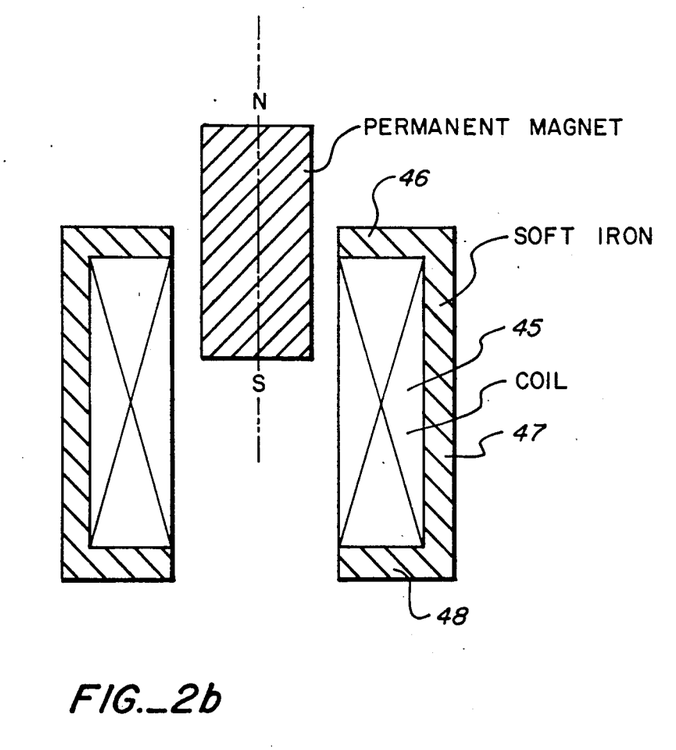
FIG. 2b is a schematic view of a modified embodiment of the magnetic elements employing a single-coil.

In FIGS. 2a and 2b the driving coils 43, 44 and 45 can be used for armature velocity sensing simultaneously while providing magnetic valve driving force. By sensing the back EMF generated by the moving flux lines of the moving armature assembly 15 intersecting the wire turns in coils 43, 44 and 45, a signal proportional to armature velocity can be created.

FIG. 2b shows the magnetic elements of a one-coil embodiment of the valve. A single coil 45 is utilized with the pole means 46, 47 and 48 providing a magnetic return path. The center of the permanent magnet armature is shown opposite the top soft iron end piece 46. However, other armature positions can provide magnetic force without current applied to the coil allowing for normally open or closed configurations.

Figure 3A:
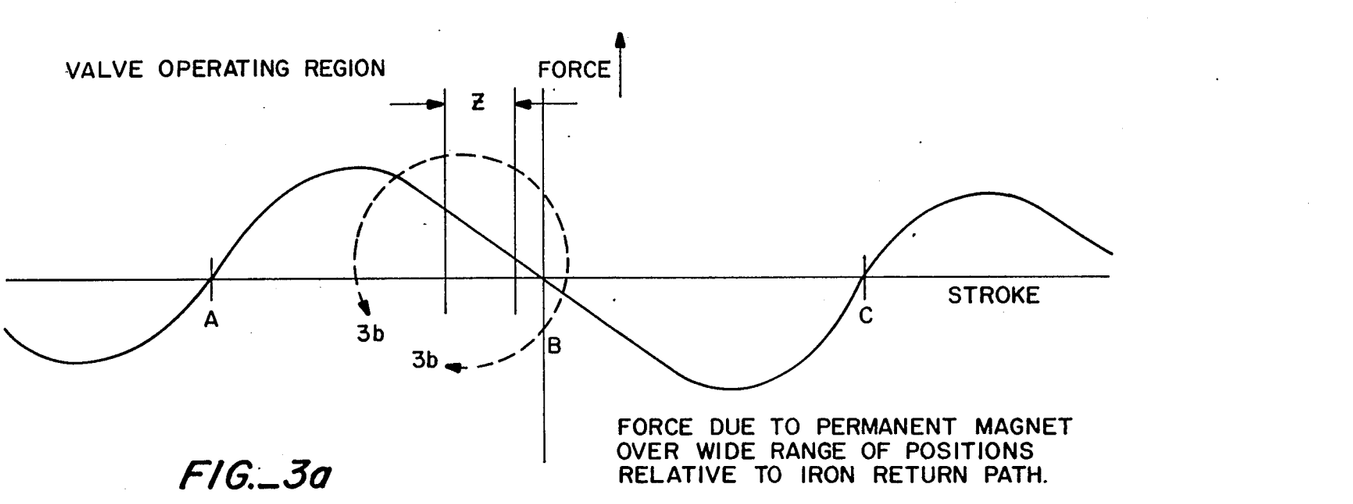
FIG. 3a is a graphical representation of the magnetic force at various positions along the movement or stroke of the moving permanent magnet armature.

FIG. 3a is a graph of the force due to the permanent magnet in the armature over a wide range of positions relative to the iron return path. The most useful range of axial positions, i.e. the preferred valve operating region, for a normally-closed valve is marked with a Z. It provides a positive magnetic force to hold the valve closed, but has a low force, and hence low power, required to hold the valve open. A normally-open valve can also be made merely by positioning the valve operating range on the opposite side of neutral point B, or by adjustment of the net spring force.

Figure 3B:
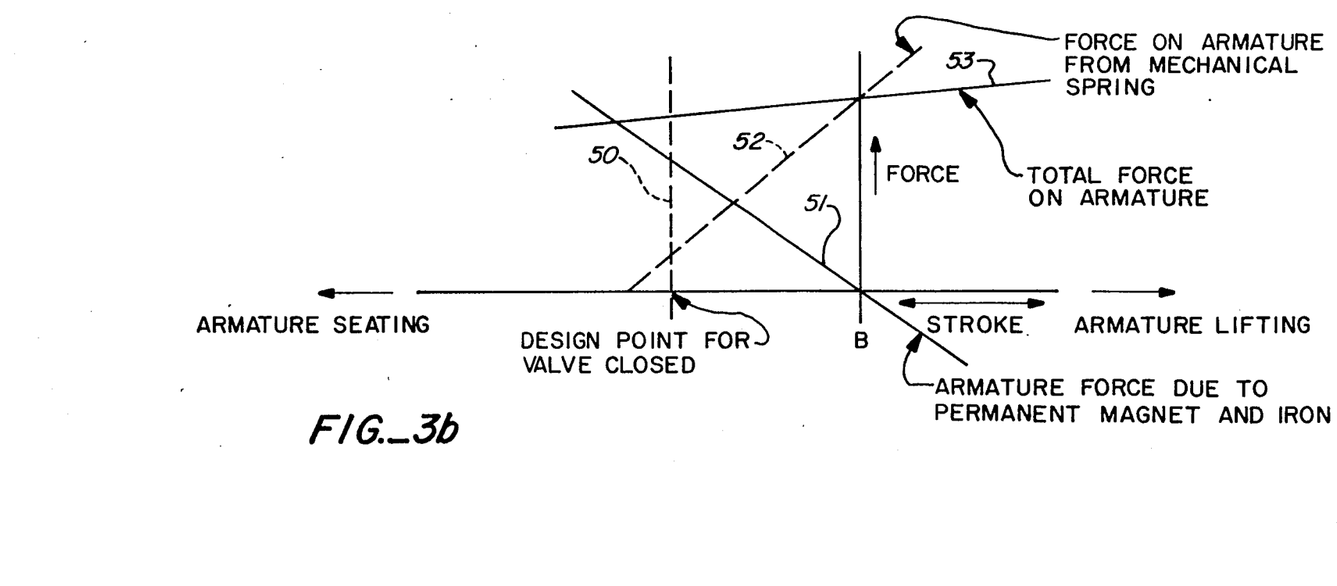
FIG. 3b is a graphical representation of the total (magnetic and spring) forces on the permanent magnet armature as it moves from a valve closed position to valve open positions.

FIG. 3b is a detail graph, taken in the circled area of FIG. 3a, showing the various forces on the armature. Line 50 represents the design point for the valve closed position. Line 51 represents the force due to the permanent magnet and iron and line 52 represents the force on the armature from the mechanical springs. The total force on the armature is represented by line 53.

Figure 4:
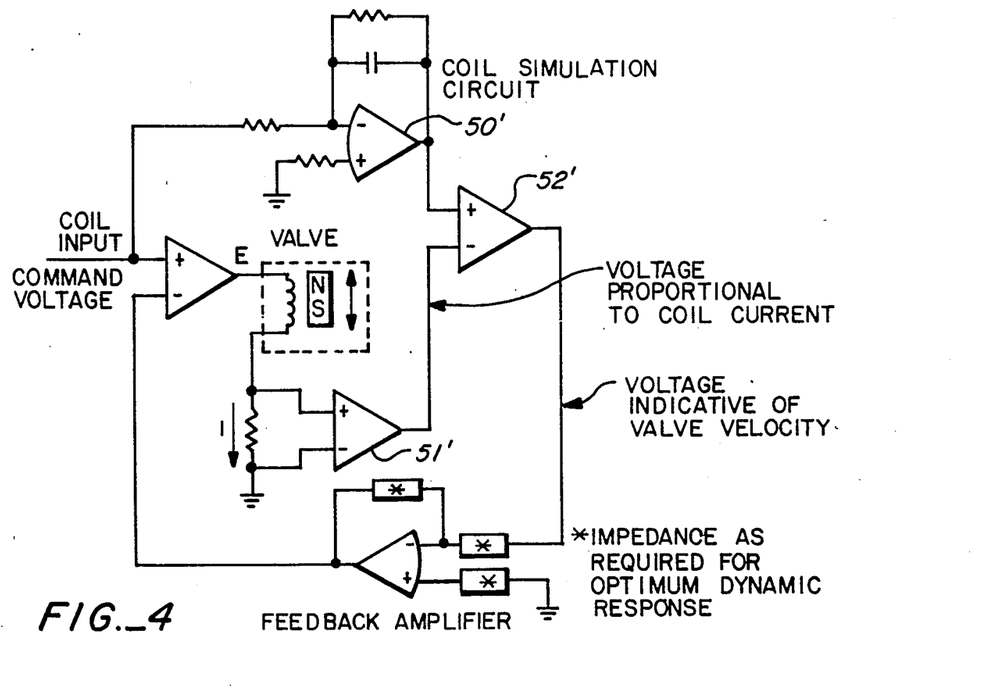
FIG. 4 is a schematic circuit drawing showing a feedback control loop circuit employed for controlling coil current and for control of armature movement.

A further portion of the invention is shown in FIG. 4, in which the dynamic damping effect is enhanced by creating a signal indicative of armature velocity, and then utilizing that signal in an active feedback loop. This can be used alone or as an auxilary stabilization feedback control loop to augment a primary flow control loop, utilizing a flow sensor. The feedback signal is developed in the following manner:

The coil drive voltage is sensed by a high gain operational amplifier 50' circuit which simulates the current-/voltage transfer function of the solenoid with the armature motionless. The output of this amplifier is thus proportional to coil current when the armature is not moving. A second summing amplifier 51' with internally fixed gain senses the actual coil current. A third summing amplifier 52' with internally fixed gain produces the difference between the outputs of the first two amplifiers, which is a signal proportional to the change in coil current resulting from armature motion. This is a signal approximately proportional to armature velocity. The feedback amplifier provides dynamic shaping for optimum response, and transmits the resulting signal to the coil driver amplifier where it subtracts from the command voltage to provide dynamic damping. Alternatively, the coil can be driven by an electrical supply with a capacitive-resistive output impedance designed to enhance the dynamic damping effect of the back emf produced by the motion of the armature.

Figure 5:
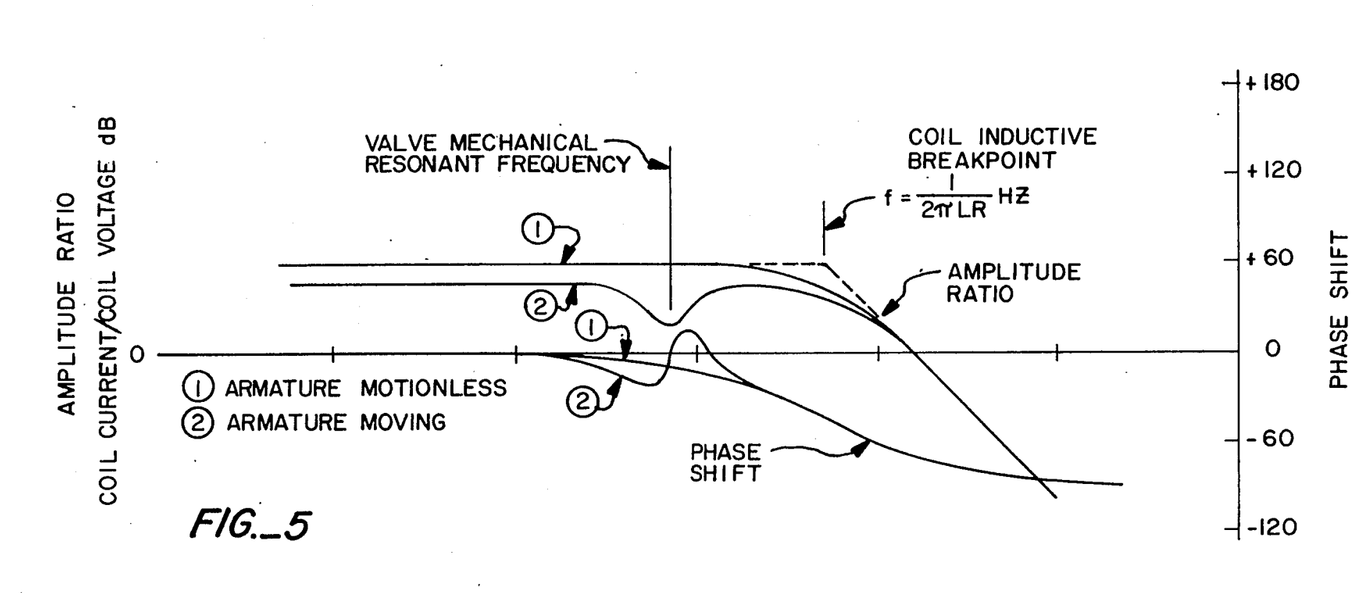
FIG. 5 is a Bode plot of solenoid current/voltage transfer function data with and without armature motion.

The nature of the signal derived by the circuit of FIG. 4 approximately proportional to armature velocity is further shown in FIG. 5 which is a Bode plot (log amplitude ratio as dB and phase shift versus log frequency) taken from test data on a valve built using this invention. The valve coil was driven by an oscillating voltage source over the frequency range shown, with the armature free to move in one case (curve 2) and restrained from moving in the other case (curve 1). It can be seen that without armature motion the current-/voltage transfer function is a simple first-order lag represented by the Laplace transform equation:

$$I/E = 1/(1 + LRs)$$

where I=coil current, E=coil voltage, L=coil inductance, R=coil resistance and s=Laplace operator.

When the magnetic armature is free to move, the motion at low frequencies follows the drive voltage, producing a back emf that gives a fairly constant reduction in coil current. At the valve resonant frequency the greater motion gives a greater back emf as shown by the dip in coil current. At high frequencies the inertia of the armature prevents significant motion and the current is the same as that measured with the armature still.

The signal created as described above can be utilized in a feedback control loop such as that shown in FIG. 4. The ability to electronically amplify and dynamically shape the velocity feedback signal permits the inherent damping effect of the back emf to be increased and tailored to yield the desired dynamic response from coil voltage input to valve position output.

Figure 6:
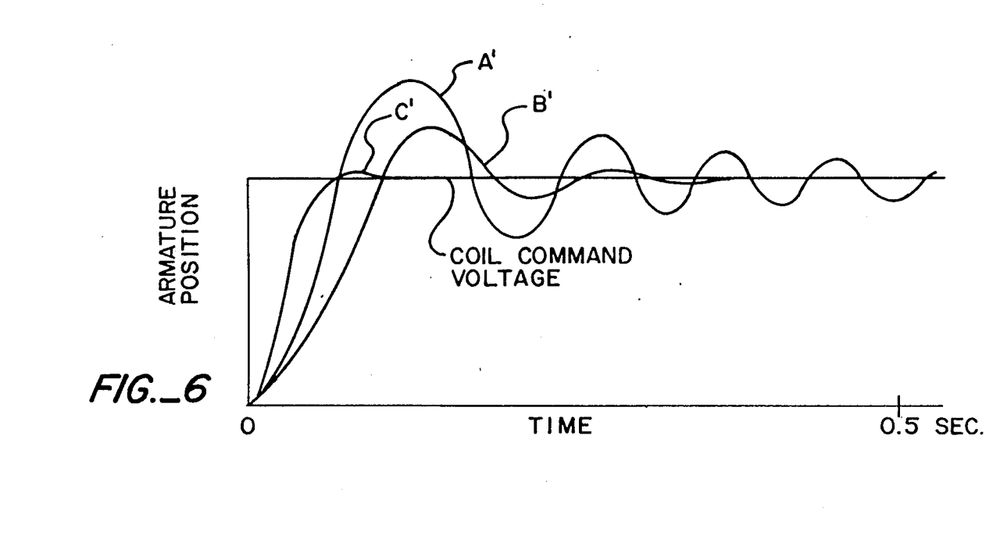
FIG. 6 is a graphical representation plotting armature position over time comparing typical responses of a prior art valve and embodiments of this invention to step changes of position command signal.

The results of operation of the feedback control loop are shown in FIG. 6, which compares typical responses of valves to step changes of position command signal. Curve A' shows the response of a prior art design including a solenoid with only a soft iron armature; the natural frequency is high and the response is fast, but the damping is very poor and the valve continues to oscillate for a long period after the upset. Curve B' shows a solenoid valve with a permanent magnet armature as in this invention, similarly driven by a step change of coil voltage. The response is not as fast, but is better damped. Curve C' shows the response of the same valve as curve B' but with a feedback control loop in accord with FIG. 4 derived from the available armature velocity signal. It shows a response which is faster, because of control signal amplification during the initial transient, but better damped because of the stabilizing effect of the velocity feedback. Normal stroke of the armature to full open position is 0.25 of the orifice diameter. Orifice diameters range from 0.2 mm to 1.5 mm.

Control of closing forces are limited in conventional valves by the inability to reverse the electromagnetic force, i.e. to push as well as pull. In a normally-closed valve, for example, increasing coil current opens the valve against a spring force, and the most rapid closure is obtained with zero coil current. In contrast, the permanent-magnet armature of this invention can be forced closed with a reverse-polarity coil current, thereby giving controllable dynamic response capabilities in both directions.

Figure 7:
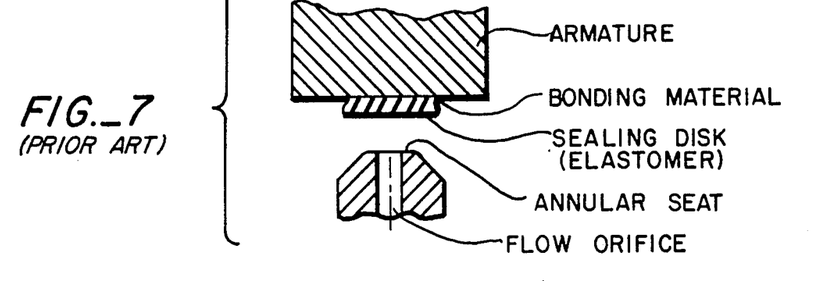
FIGS. 7-9 illustrate in partial elevational cross-sectional views of various valve seat and seal retention structures of the prior art.
Figure 8:
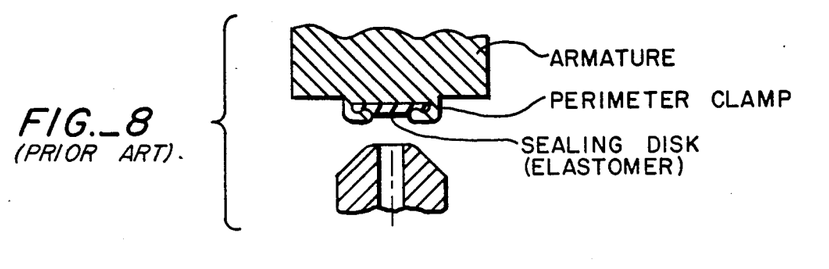
Figure 9:
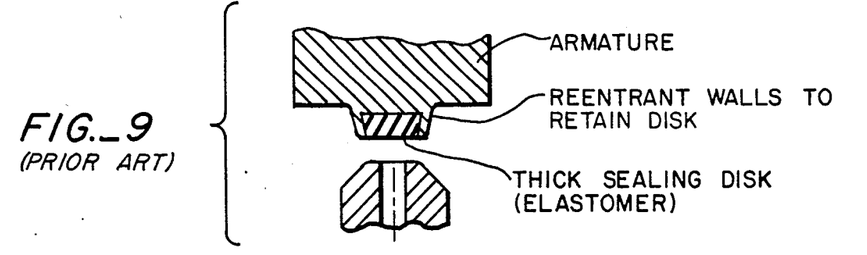

FIG. 7 shows a prior art elastomeric sealing disk which is bonded by a suitable adhesive to a flat end of a conventional soft iron armature. Upon armature movement, the flat sealing disk seats on and seals the annular seat surrounding a flow orifice. FIG. 8 shows a prior art variant where the elastomeric disk is clamped in place by a perimeter clamp ring or bendable tabs extending from the armature flat end. FIG. 9 shows a further prior art seal in which re-entrant walls at the armature end retain a thick elastomeric sealing disk.

Figure 10:
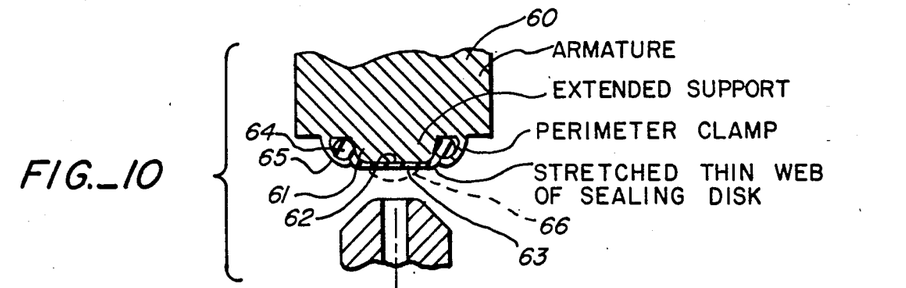
FIG. 10 shows a partial elevational cross-sectional view of the valve seal, valve seat and seal retention structure of this invention.

FIG. 10 shows in similar view the improvement of this invention where armature housing 60 has an extended central end projection 61 on the end 62 of which a central circular web 63 is stretched. The thin web 63 is peripherally supported and tensioned by a thick integral annular O-ring support or toroidal bead 64. Bead 64 is clamped by a perimeter clamp ring or a series of tabs 65 extending from the end of armature housing 60.

Figure 11A:
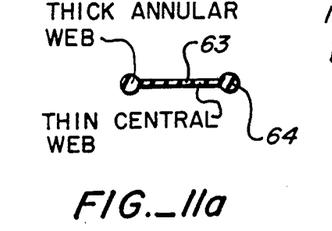
FIGS. 11a and 11b illustrate in side cross-sectional and plan views the valve seal of this invention.
Figure 11B:
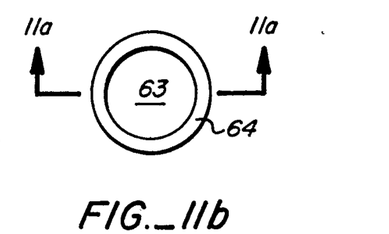

FIGS. 11a and 11b shows the seal disk per se in the form of web 63 and bead 64 in cross-sectional side view and plan view. In a typical installation, the thin central web has a thickness unstretched of about 0.2 to 0.4 mm and a stretched thickness of about 0.19 to 0.39 mm. The overall diameter of the sealing disk is about 2.5 mm and the thickness of the annular bead about 1 to 1.5 mm. It seals an orifice which normally has a diameter ranging from of about 0.2 mm to 1.5 mm.. The preferred elastomeric material of the sealing disk is Viton or KALREZ fluoroelastomer although other materials such as Buna-N elastomer may be employed. A durometer reading of about 60 to 90 is satisfactory. It is contemplated that more than one orifice may be sealed by the seal disk. Further, the annular bead surrounding the central web of the seal disk may be continuously supported or discontinuously supported around its periphery by a perimeter clamp or clamps which tension the central web or membrane over a support surface. The support surface on the armature housing extension, while shown as planar, may be nonplanar and be closable on a similar nonplanar orifice valve seat. An important case of nonplanar support is one wherein the surface under the web is curved in a manner approximating a portion of a large radius sphere, for example, having a radius of curvature of about 1 cm, or dome. This is shown by the dotted lines 66 and 67 in FIG. 10 on the web support and valve seat, respectively. The purpose of curvature is to provide the stretched web with a resulting force against the support at all locations on its surface, thereby preventing the web from lifting off the support in the presence of a pressure differential and without the need for bonding. It is preferred that the elastomer be maintained so as to have a uniform cross-sectional membrane thickness.

The above description of embodiments of this invention is intended to be illustrative and not limiting. Other embodiments of this invention will be obvious to those skilled in the art in view of the above disclosure.

We claim:

1. A modulating valve comprising:
   a flow orifice having an orifice seat;
   an armature assembly including a valve seal on an axial end of said armature assembly, said valve seal being axially oriented with respect to said orifice seat;
   at least one annular solenoid coil;
   said armature assembly including a cylindrical armature housing confined within an annulus formed by said at least one annular solenoid coil and moveable axially with respect to said at least one annular solenoid coil to any displaced selected position between a full open and close position of said valve seal and said orifice seat;
   a permanent magnet fixedly mounted in said cylindrical armature housing axially within said annulus of said at least one annular solenoid coil;
   further including a first magnetically inert cylindrical housing extending interiorly of said at least one annular solenoid coil;
   a second magnetically inert cylindrical housing annularly spaced interiorly of said first magnetically inert cylindrical housing forming a first flow passage therebetween;
   said cylindrical armature housing having an outer peripheral surface annularly spaced from said second magneticcally inert cylindrical housing forming a second flow passage therebetween; and
   wherein said permanent magnet and said at least one annular solenoid coil are remote from said first and second flow passages.

2. The valve of claim 1 in which said cylindrical armature housing is made from an impermeable chemically resistant nonmagnetic material.

3. A controller for opening and modulating a modulating valve having
   a flow orifice having an orifice seat;

an armature assembly including a valve seal on an axial end of said armature assembly, said valve seal being axially oriented with respect to said orifice seat;

at least one annular solenoid coil;

said armature assembly including a cylindrical armature housing confined within an annulus formed by said at least one annular solenoid coil and moveable axially with respect to said at least one annular solenoid coil to any displaced selected position between a full open and close position of said valve seal and said orifice seat; and a permanent magnet fixedly mounted in said cylindrical armature housing axially within said annulus of said at least one annular solenoid coil, said controller comprising:

means for deriving a velocity-dependent signal from a back emf generated by the movement of said cylindrical armature housing and said permanent magnet and the resultant changing magnetic field's effect on a current/voltage relationship of current flowing through said at least one annular solenoid coil; and means, including a feedback loop, for utilizing said veloicity-dependent signal for reducing overshoot of said cylindrical armature and enhancing the speed of response and stability of said valve to dynamic changes.

4. A modulating valve comprising:

a flow orifice having an orifice seat;

an armature assembly including a valve seal on an axial end of said armature assembly, said valve seal being axially oriented with respect to said orifice seat;

at least one annular solenoid coil;

said armature assembly including a cylindrical armature housing confined within an annulus formed by said at least one annular solenoid coil and moveable axially with respect to said at least one annular solenoid coil to any displaced selected position between a full open and close position of said valve seal and said orifice seat;

a permanent magnet fixedly mounted in said cylindrical armature housing axially within said annulus of said at least one annular solenoid coil; and wherein said at least one annular solenoid coil comprises a single coil and further including dual magnetic return paths, wherein one of said magnetic return paths is connected to a magnetic field sensor providing a position or velocity signal from the magnetic field of said permanent magnet within said cylindrical armature housing, and a control circuit means for utilizing said position or velocity signal in a feedback loop to reduce over shoot of said moving cylindrical armature housing.

5. A modulating valve comprising:

a flow orifice having an orifice seat;

an armature assembly including a valve seal on an axial end of said armature assembly, said valve seal being axially oriented with respect to said orifice seat;

at least one annular solenoid coil;

said armature asembly including a cylindrical armature housing confined within an annulus formed by said at least one annular solenoid coil and moveable axially with respect to said at least one annular solenoid coil to any displaced selected position between a full open and close position of said valve seal and said orifice seat;

a permanent magnet fixedly mounted in said cylindrical armature housing axially within said annulus of said at least one annular solenoid coil; and further comprising an electrical supply to said at least one annular solenoid coil including a capacitive-resistive output impedance such that back emf dynamic damping produced by movement of said cylindrical armature housing is enhanced.

6. A modulating valve comprising:

a flow orifice having an orifice seat;

an armature assembly including a valve seal on an axial end of said armature assembly, said valve seal being axially oriented with respect to said orifice seat;

at least one annular solenoid coil;

said armature assembly including a cylindrical armature housing confined within an annulus formed by said at least one annular solenoid coil and moveable axially with respect to said at least one annular solenoid coil to any displaced selected position between a full open and close position of said valve seal and said orifice seat;

a permanent magnet fixedly mounted in said cylindrical armature housing axially within said annulus of said at least one annular solenoid coil; and wherein said at least one annular solenoid coil is driven by a variable current source and a coil voltage is sensed and compared with asynthesized voltage signal derived from the coil drive current and representing the voltage with the armature motionless, said comparison providing a signal indicative of armature velocity.

7. The valve of claim 6 in which said armature velocity signal is utilized in a feedback loop to provide means for reducing overshoot and optimizing the dynamic response and stability of the valve.

8. A modulating valve comprising:

a flow orifice having an orifice seat;

an armature assembly including a valve seal on an axial end of said armature assembly, said valve seal being axially oriented with respect to said orifice seat;

at least one annular solenoid coil;

said armature assembly including a cylindrical armature housing confined within an annulus formed by said at least one annular solenoid coil and moveable axially with respect to said at least one annular solenoid coil to any displaced selected position between a full open and close position of said valve seal and said orifice seat;

a permanent magnet fixedly mounted in said cylindrical armature housing axially within said annulus of said at least one annular solenoid coil; and wherein said at least one annular solenoid coil is driven by a variable voltage source and a coil current is sensed and compared with a synthesized signal derived from the coil drive voltage and representing the current with the armature motionless, said comparison providing a signal indicative of armature velocity.

9. The valve of claim 8 in which said armature velocity signal is utilized in a feedback loop to provide means for reducing overshoot and optimizing the dynamic response and stability of the valve.

10. A modulating valve comprising:

a flow orifice having an orifice seat;

an armature assembly including a valve seal on an axial end of said armature assembly, said valve seal being axially oriented with respect to said orifice seat;

at least one annular solenoid coil;

said armature assembly including a cylindrical armature housing confined within an annulus formed by said at least one annular solenoid coil and moveable axially with respect to said at least one annular solenoid coil to any displaced selected position between a full open and close position of said valve seal and said orifice seat;

a permanent magnet fixedly mounted in said cylindrical armature housing axially within said annulus of said at least one annular solenoid coil; and wherein said valve seal comprises a circular elastomeric disk having a thin central web and an outer integral circular annular toroidal bead.

11. The valve of claim 10 in which said annular toroidal bead is circular and has a diameter greater than the axial thickness of said thin central web.

12. The valve of claim 11 in which said cylindrical armature housing has a central extension and wherein said seal central web abuts and is supported by said central extension.

13. A modulating valve comprising:

a flow orifice having an orifice seat;

an armature assembly including a valve seal on an axial end of said armature assembly, said valve seal being axially oriented with respect to said orifice seat;

at least one annular solenoid coil;

said armature assembly including a cylindrical armature housing confined within an annulus formed by said at least one annular solenoid coil and moveable axially with respect to said at least one annular solenoid coil to any dispalced selected position between a full open and close position of said valve seal and said orifice seat;

a permanent magnet fixedly mounted in said cylindrical armature housing axially within said annulus of said at least one annular solenoid coil; and including a ferroimagnetic housing, a ferromagnetic disk dividing said housing into dual magnetic field paths, a first path containing said at least one annular solenoid coil and a second path including a velocity or position sensor.

* * * * *

UNITED STATES PATENT AND TRADEMARK OFFICE
CERTIFICATE OF CORRECTION

PATENT NO. : 4,690,371
DATED : September 1, 1987
INVENTOR(S) : Robert W. Bosley et al.

It is certified that error appears in the above-identified patent and that said Letters Patent is hereby corrected as shown below:

Col. 4, line 27, "24." should read --24,--.

Col. 8, Claim 1, line 58, "magneticcally" should read --magnetically--.

Col. 9, Claim 3, line 26, "veloicity" should read --velocity--.

Col. 9, Claim 4, line 55, "over shoot" should read --overshoot--.

Col. 10, Claim 6, line 31, "asynthesized" should read -- a synthesized--.

Col. 12, Claim 13, lines 10-11, "aramture" should read --armature--.

Col. 12, Claim 13, line 14, "dispalced" should read --displaced--.

Col. 12, Claim 13, line 20, "ferroimagnetic" should read --ferromagnetic--.

Signed and Sealed this

Eighth Day of November, 1988

Attest:

DONALD J. QUIGG

Attesting Officer

Commissioner of Patents and Trademarks